(12) United States Patent
Kent

(10) Patent No.: US 11,014,951 B2
(45) Date of Patent: May 25, 2021

(54) COMPOSITIONS AND METHODS FOR DEPOLYMERIZING LIGNIN USING A CHELATOR-MEDIATED FENTON REACTION

(71) Applicant: National Technology & Engineering Solutions of Sandia, LLC, Albuquerque, NM (US)

(72) Inventor: Michael S. Kent, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/965,758

(22) Filed: Apr. 27, 2018

(65) Prior Publication Data

US 2019/0002490 A1    Jan. 3, 2019

Related U.S. Application Data

(60) Provisional application No. 62/490,990, filed on Apr. 27, 2017.

(51) Int. Cl.
*C07G 1/00* (2011.01)
(52) U.S. Cl.
CPC ...................................... *C07G 1/00* (2013.01)
(58) Field of Classification Search
CPC ....................................................... C07G 1/00
See application file for complete search history.

(56) References Cited

U.S. PATENT DOCUMENTS

| 3,939,286 | A  | * | 2/1976 | Jelks ...................... | A23K 10/32 |
|  |  |  |  |  | 426/312 |
| 6,214,976 | B1 | * | 4/2001 | Watanabe ................ | C08H 6/00 |
|  |  |  |  |  | 530/500 |
| 6,770,168 | B1 | * | 8/2004 | Stigsson .................. | D21C 1/06 |
|  |  |  |  |  | 162/24 |
| 2010/0121110 | A1 | * | 5/2010 | Voitl ........................ | C08H 6/00 |
|  |  |  |  |  | 568/426 |
| 2014/0249300 | A1 | * | 9/2014 | Bozell ...................... | C07G 1/00 |
|  |  |  |  |  | 530/507 |
| 2016/0031843 | A1 | * | 2/2016 | Socha .................... | C07C 209/28 |
|  |  |  |  |  | 514/471 |
| 2019/0085006 | A1 | * | 3/2019 | Krawczyk ................ | C08H 8/00 |

OTHER PUBLICATIONS

Rodriguez et al. (Water Science and Technology, 2002, vol. 44 No. 5 pp. 251-256) (Year: 2002).*

(Continued)

*Primary Examiner* — Liam J Heincer
(74) *Attorney, Agent, or Firm* — Robin C. Chiang; Lawrence Berkeley National Laboratory

(57) ABSTRACT

The present invention provides for a method to depolymerize a lignin comprising: (a) mixing a lignin, a chelator, and $FeCl_3$ to produce a first solution, (b) optionally incubating the solution for a first suitable period of time, (c) introducing an oxidizing agent to the first solution to produce a second solution, and (d) optionally incubating the solution for a second suitable period of time; such that at least one aromatic ring of one lignin polymer is opened.

26 Claims, 6 Drawing Sheets

(56) References Cited

OTHER PUBLICATIONS

Passauer et al. (Holzforschung, vol. 65, 319-326, 2011) (Year: 2011).*
Zakzeski, et al., "The Catalytic Valorization of Lignin for the Production of Renewable Chemicals." Chem Review. vol. 110, pp. 3552-3599 (2010).
Anderson, et al., "Flowthrough Reductive Catalytic Fractionation of Biomass." Joule vol. 1, pp. 613-622 (2017). https://doi.org/10.1016/j.joule.2017.10.004.
Fernandez-Rodriguez, et al., "Lignin depolymerization for phenolic monomers production by sustainable processes." Journal of Energy Chemistry. vol. 26, pp. 622-631 (2017).
Gladden et al., "Base-Catalyzed Depolymerization of Solid Lignin-Rich Streams Enables Microbial Conversion." American Chemical Society (ACS) Sustainable Chemistry and Engineering. vol. 5, pp. 8171-8180 (2017). DOI: 10.1021/acssuschemeng.7b01818.
Schutyser, et al., "Chemicals from lignin: an interplay of lignocellulose fractionation, depolymerisation, and upgrading." Royal Society of Chemistry, Chem. Soc. Rev., vol. 47, p. 852 (2018). DOI: 10.1039/c7cs00566k.
Phongpreecha, et al., "Predicting lignin depolymerization yields from quantifiable properties using fractionated biorefinery lignins." Royal Society of Chemistry, Green Chemistry, vol. 19, pp. 5131-5143 (2017). Doi: 10.1039/c7gc02023f.
Beckham, et al., "Opportunities and challenges in biological lignin valorization." Current Opinion in Biotechnology vol. 42, pp. 40-53 (2016). www.sciencedirect.com.
Abdelaziz, et al., "Biological valorization of low molecular weight lignin." Biotechnology Advances. vol. 34, pp. 1318-1346 (2016). journal homepage: www.elsevier.com/locate/biotechadv.
Chen, et al., "Biological valorization strategies for converting lignin into fuels and chemicals." Renewable and Sustainable Energy Reviews. vol. 73, pp. 610-621 (2017).
Rahimi, et al., "Chemoselective Metal-Free Aerobic Alcohol Oxidation in Lignin." Journal of the American Chemical Society. vol. 135, pp. 6415-6418 (2013).
Gasser, et al., "Sequential lignin depolymerization by combination of biocatalytic and formic acid/formate treatment steps." Appl Microbiol Biotechnol., Environmental Biotechnology. pp. 1-14 Springer-Verlag Berlin Heidelberg Published on-line: Nov. 30, 2016. DOI 10.1007/s00253-016-8015-5.
Rahimi, et al., "Formic-acid-induced depolymerization of oxidized lignin to aromatics." Nature, vol. 515, p. 249 (2014). DOI: 10.1038/nature13867.
Lan, et al., "Protection Group Effects During a,g-Diol Lignin Stabilization Promote High-Selectivity Monomer Production." GDCh Communications. Lignin Valorization. Angew. Chem. Int. Ed., vol. 57, 1356-1360 (2018). DOI: 10.1002/anie.201710838.
Shuhi, et al., "Formaldehyde stabilization facilitates lignin monomer production during biomass depolymerization." Science Mag., Research Reports, Biomass Processing, vol. 354, Issue 6310, pp. 329-333 (2016).
Wiermans, et al., "Unprecedented catalyst-free lignin dearomatization with hydrogen peroxide and dimethyl carbonate." Royal Society of Chemistry, RSC Advances, vol. 5, 4009-4018 (2015). DOI: 10.1039/c4ra13113d.
Qin, et al., "Biorefinery Lignosulfonates from Sulfite-Pretreated Softwoods as Dispersant for Graphite." ACS Sustainable Chemistry Engineering, Research Article. pubs.acs.org/journal/ascecg. Revised: Feb. 24, 2016. DOI: 10.1021/acssuschemeng.5b01664.
He et al., "Oxidation of Kraft Lignin with Hydrogen Peroxide and its Application as a Dispersant for Kaolin Suspensions." ACS Sustainable Chemistry Engineering, Research Article. ACS Sustainable Chem. Eng. vol. 5, pp. 10597-10605 (2017).
Aro., et. al., "Production and Application of Lignosulfonates and Sulfonated Lignin." Wiley Online Library, Wiley-VCH Verlag GmbH & Co. KGaA, Weinheim ChemSusChem Reviews., vol. 10, 1861-1877 (2017). DOI: 10.1002/cssc.201700082.
Linger, et al., "Lignin valorization through integrated biological funneling and chemical catalysis." Applied Biological Sciences. PNAS. vol. 111 No. 33, pp. 2013-12018 (2014). www.pnas.org/cgi/doi/10.1073/pnas.1410657111. DOI:10.1073/pnas.1410657111/-/DCSupplemental.
Araujo, et al., "Fenton's Reagent-Mediated Degradation of Residual Kraft Black Liquor." Revised Nov. 7, 2001; Accepted Nov. 16, 2001. Applied Biochemistry and Biotechnology. vol. 97 (2002). 0273-2289/02/97/0091/$13.25.
Mae, et al., "A New Conversion Method for Recovering Valuable Chemicals from Oil Palm Shell Wastes Utilizing Liquid-Phase Oxidation with H2O2 under Mild Conditions." American Chemical Society. Energy and Fuels. vol. 14, No. 6, pp. 1212-1218 (2000). 10.1021/el0000911 CCC: $19.00.
Kato et al., "Pretreatment of lignocellulosic biomass using Fenton chemistry." El Sevier, Bioresource Technology. vol. 162, pp. 273-278 (2014). http://dx.doi.org/10.1016/j.biortech.2014.03.151.
Zeng, et al., "Biomimetic Fenton-Catalyzed Lignin Depolymerization to High-Value Aromatics and Dicarboxylic Acids." Wiley Online Library, Wiley-VCH Verlag GmbH & Co. KGaA, Weinheim. ChemSusChem. vol. 8, pp. 861-871 (2015). DOI: 10.1002/cssc.201403128.
Covinich, et al., "Advanced Oxidation Processes for Wastewater Treatment in the Pulp and Paper Industry: A Review." American Journal of Environmental Engineering. vol. 4, No. 3, pp. 56-70 (2014). DOI: 10.5923/j.ajee.20140403.03.
Areskogh, et al., "Fenton's reaction: a simple and versatile method to structurally modify commercial lignosulphonates." Manuscript accepted Jan. 19, 2011. Chemical Pulping. Nordic Pulp and Paper Research Journal vol. 26, No. 1, pp. 1-10 (2011).
Rochez, et al., "Dispersion of multiwalled carbon nanotubes in water by lignin." J Mater Scii. vol. 48, pp. 4962-4964 (2013). DOI 10.1007/s10853-013-7278-9.
Estelle, et al., "Lignin as dispersant for water-based carbon nanotubes nanofluids: Impact on viscosity and thermal conductivity." International Communications in Heat and Mass Transfer. vol. 57, pp. 8-12 (2014). http://dx.doi.org/10.1016/j.icheatmasstransfer.2014.07.012.
Xie, et al., "Lignin as Renewable and Superior Asphalt Binder Modifier." ACS Sustainable Chemistry and Engineering. vol. 5, pp. 2817-2823 (2017). DOI: 10.1021/acssuschemeng.6b03064.
Mancera, et al., "Physicochemical characterisation of sugar cane bagasse lignin oxidized by hydrogen peroxide." Polymer Degradation and Stability. vol. 95, pp. 470-476 (2010).
Tadros, et al., "Polymeric surfactants in disperse systems." Advances in Colloid and Interface Science. 147-148 and pp. 281-299 (2009). DOI:10.1016/j.cis.2008.10.005.
Pandey, et al., "Lignin Depolymerization and Conversion: A Review of Thermochemical Methods." Chemical Engineering and Technology, vol. 34, No. 1, pp. 29-41 (2011). www.cet-journal.com DOI: 10.1002/ceat.201000270.
Ragauskau, et al., "Lignin Valorization: Improving Lignin Processing in the Biorefinery" Science. vol. 344, 1246843 (2014). http://dx.doi.org/10.1126/science.1246843 DOI: 10.1126/science.1246843.
Wang et al., "Recent Development in Chemical Depolymerization of Lignin: A Review." Journal of Applied Chemistry. Hindawi Publishing Corporation. vol. 2013, Article ID 838645, 9 pages (2013). http://www.hindawi.com.

* cited by examiner

Lignin-derived material:
4 mM (FeCl3+DHB) + 0.5% H2O2

PAA  Mw = 2000 g/mol

Lignin-derived material:
4 mM (FeCl3+DHB) + 0.5% H2O2

PAA Mw = 2000 g/mol

Lignin-derived material:
4 mM (FeCl3+DHB) + 0.5% H2O2

COMPOSITIONS AND METHODS FOR DEPOLYMERIZING LIGNIN USING A CHELATOR-MEDIATED FENTON REACTION

RELATED PATENT APPLICATIONS

The application claims priority to U.S. Provisional Patent Application Ser. No. 62/490,990, filed Apr. 27, 2017, which is herein incorporated by reference in its entirety.

STATEMENT OF GOVERNMENTAL SUPPORT

The invention was made with government support under Contract Nos. DE-AC02-05CH11231 awarded by the U.S. Department of Energy. The government has certain rights in the invention.

FIELD OF THE INVENTION

The present invention is in the field of depolymerization of lignin.

BACKGROUND OF THE INVENTION

Lignin is one of the most abundant biopolymers found in the planet earth. However, the residual lignin (20-30 wt % of the initial biomass) obtained after pretreatment is often overlooked as byproduct and in the paper and pulp industry and typically used for waste heat production. The structure of lignin suggests that it can be a valuable source of chemicals, particularly phenolics, which could significantly improve the economics of a biorefinery. Unfortunately depolymerization of lignin with selective bond cleavage is still the major challenge for converting it into value-added chemicals.

There is a need for a means to break down high molecular weight, water-insoluble lignin into fragments that can be readily upgraded into fuels or chemicals. Currently there are no economically viable methods to accomplish this. Methods to date that achieve substantial lignin breakdown to water soluble products have been reviewed elsewhere (Zakzewski et al. 2010; Pandey et al. 2011; Wang et al. 2013), but include hot alkaline treatment (Linger, et al. 2014) and a recently reported combination of oxidation in alkaline hydrogen peroxide followed by treatment in formic acid/sodium formate solution at 110° C. (Rahimi et al. 2014). The latter resulted in 52% of the original lignin converted to well-defined aromatic compounds. Treatment of unoxidized lignin in the formic acid/sodium formate solution at 110° C. resulted in a conversion of only 7%. Another current method involves lignin pretreatment and depolymerization requiring sulfuric acid or alkali under much high temperature (such as 180° C.), which results in the main disadvantages of high-energy consumption and waste emission. Development of a simple, efficient and economic route to dissolve and depolymerize lignin is still a challenge.

SUMMARY OF THE INVENTION

The present invention provides for a composition and methods for depolymerizing lignin as described herein. The present invention provides a process in which higher loading lignin is dissolved at a lower temperature, and/or the dissolved lignin is depolymerized into lower molecular weight at a temperature as low as possible. In some embodiments, the above two processes are performed separately or coupled together at room temperature.

The present invention provides for a method to depolymerize a lignin comprising: (a) mixing a lignin, a chelator, and $FeCl_3$ to produce a first solution, (b) optionally incubating the solution for a first suitable period of time, (c) introducing an oxidizing agent to the first solution to produce a second solution, and (d) optionally incubating the solution for a second suitable period of time; such that at least one aromatic ring of one lignin polymer is opened.

In some embodiments, the aromatic ring opened by the present invention forms a polyacid as a result of the aromatic ring being opened. In some embodiments, the polyacid comprises two carboxylic functional groups. In some embodiments, the method results in a mixture of lignin polymers comprising more than one polymer wherein each polymer has at least one aromatic ring opened, wherein optionally each polymer has the opened aromatic ring on a different part of each polymer. In some embodiments, the lignin polymer with at least one aromatic ring opened is water-soluble. In some embodiments, water-soluble lignin polymer mixture produced by the method has an average molecular weight smaller than the average molecular weight of the lignin, or mixture of lignin, at the start of the method.

In some embodiments, the method results in at least about 1 mg, 5 mg, 10 mg, 15, mg, or 20 mg of water-insoluble lignin is converted into a water-soluble lignin from every 100 mg of water-insoluble lignin.

In some embodiments, the oxidizing agent is $H_2O_2$ or molecular oxygen ($O_2$), or both.

In some embodiments, the (c) introducing an oxidizing agent to the first solution step comprises bubbling a gas composition comprising $O_2$ into the first solution. In some embodiments, the gas composition comprises at least about 20%, 40%, 50%, 60%, 70%, 80%, or 90% of $O_2$. In some embodiments, the gas composition comprises essentially 100% of $O_2$. In some embodiments, the gas composition is bubbled through the first solution at a rate of at least about 0.01 standard cubic feet per hour (SCFH), 0.02 SCFH, 0.03 SCFH, 0.04 SCFH, or 0.05 SCFH. In some embodiments, the (c) introducing an oxidizing agent to the first solution step results in at least about 0.1%, 0.2%, 0.3%, 0.4%, or 0.5% of [oxidizing agent]$_0$.

In some embodiments, the chelator is any chelator that can chelate Fe to facilitate the reduction of Fe(III) to Fe(II). In some embodiments, the chelator is 1,2-dihydroxybenzene (DHB), 2,3-dihydroxybenzoic acid (DHBA), pyrogallol, or a mixture thereof.

The present invention provides for a solution comprising a lignin, a chelator, and $FeCl_3$.

The present invention provides for a mixture of depolymerized lignin produced by the method of the present invention.

In some embodiments, the lignin is obtained from pretreatment of a biomass. In some embodiments, the lignin has a concentration of from about 1 mg/mL to about 100 mg/mL. In some embodiments, the lignin has a concentration of from about 1 mg/mL to about 50 mg/mL. In some embodiments, the chelator is 1,2-dihydroxybenzene (DHB) or 1,2-benzenediol, or any DHB further substituted with one or more hydroxyl groups, such as 1,2,3-trihydroxybenzene and 1,2,3,4-tetrahydroxybenzene. In some embodiments, the $FeCl_3$ has a concentration of from about 0.1 mM to about 10 mM. In some embodiments, the $FeCl_3$ has a concentration of from about 0.5 mM to about 4 or 5 mM. In some embodiments, the first suitable period of time and second suitable period of time is from about 24 hours to about 48 hours, optionally at about room temperature. In some embodiments, the $H_2O_2$ has a concentration of from about 0.1% to about 10% mg/mL. In some embodiments, the $H_2O_2$ has a concentration of from about 0.5% to about 5% mg/mL.

In some embodiments, the method comprises the following: Preparing an equimolar stock solution of dihydroxybenzene (DHB) and $FeCl_3$ (typically 10 mM) in water at pH 3. Allowing the solution to incubate at least 30 min results in the formation of DHB/Fe(III) complexes. Using that stock solution to prepare a solution of 4 mM DHB/Fe(III) complexes in water at pH 3 containing lignin. Stirring the mixture vigorously for a minimum of several hours (typically overnight). Then adding hydrogen peroxide ($H_2O_2$) at 0.5% (5 mg/ml) and allow the reaction to proceed to completion. The time required for completion varies with the amount of lignin. This results in nearly complete conversion of the water-insoluble lignin into an aqueous solution of lignin breakdown products at pH 3. The product distribution (size and chemical nature of the lignin-derived molecular fragments) will vary with the amount of lignin used as well as with the reaction time. In some embodiments, the method comprises the use of 4 mM DHB, 4 mM, $FeCl_3$, 5 mg/ml $H_2O_2$, and lignin content ranging from 2.5 mg per ml of solution to 12.5 mg per ml of solution.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
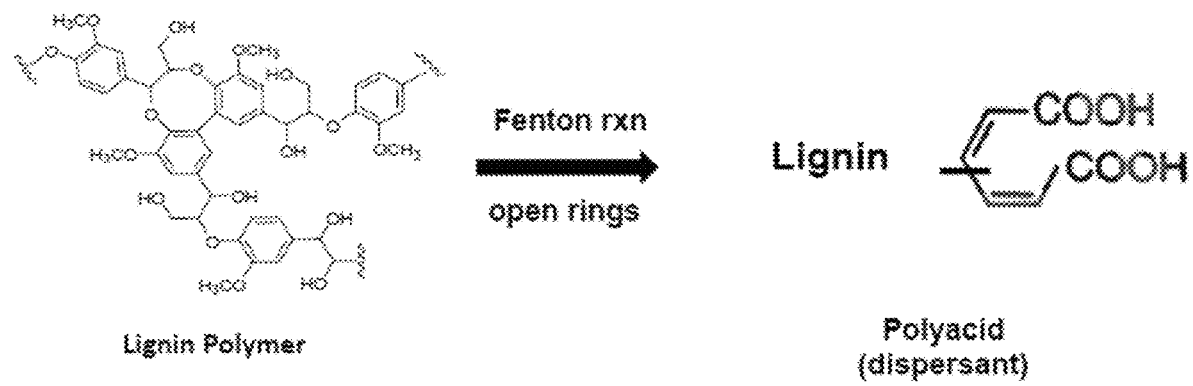
FIG. 1 shows the Fenton reaction of lignin using polyacrylic acid (PAA) as a stabilizer and dispersant. High MW solubilized fragments are rich in the COOH functional group.
Figure 2:
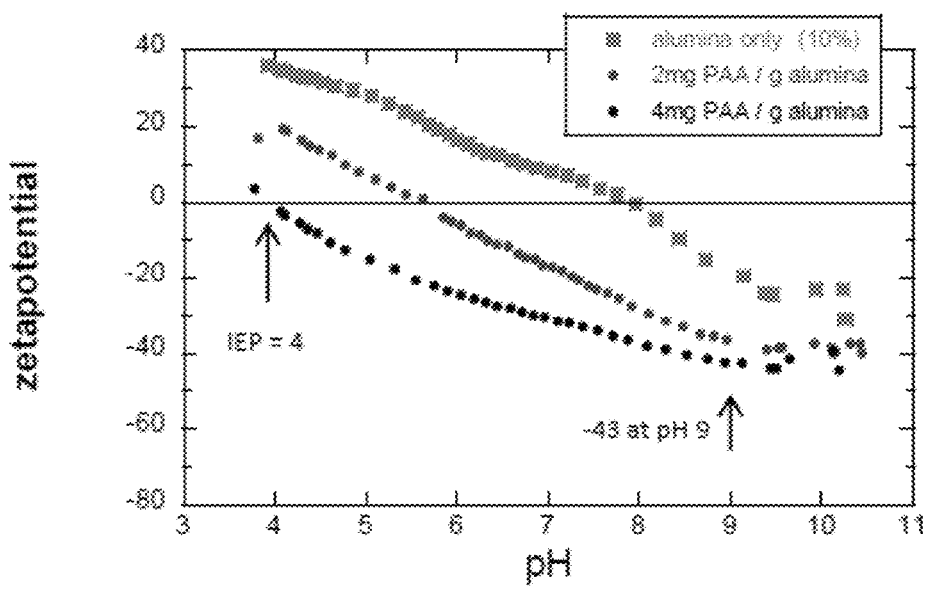
FIG. 2 shows the zetapotential measurements of lignin treated with PAA and alumina. Zetapotential+/−40 to +/−60 indicates good stability. Zetapotential comparable for PAA and for lignin-derived material indicates good stability.
Figure 3:
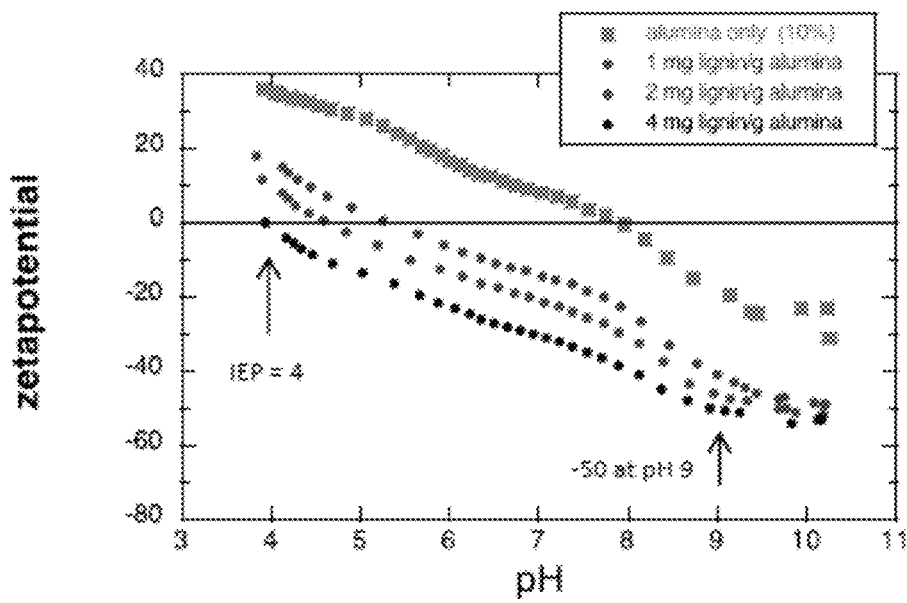
FIG. 3 shows the zetapotential measurements of lignin treated with $FeCl_3$ and $DHB/H_2O_2$ and alumina. Zetapotential+/−40 to +/−60 indicates good stability. Zetapotential comparable for PAA and for lignin-derived material indicates good stability.
Figure 4:
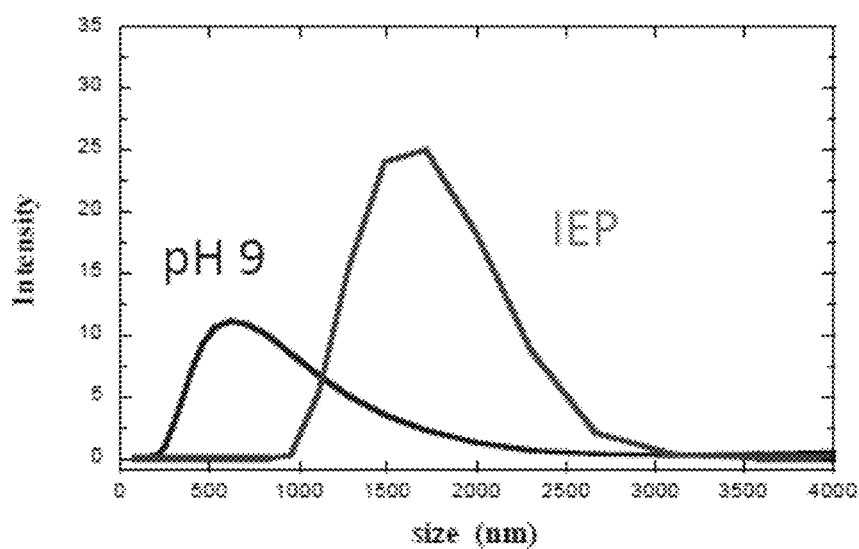
FIG. 4 shows the light scanning (PALS) measurements of lignin treated with PAA.
Figure 5:
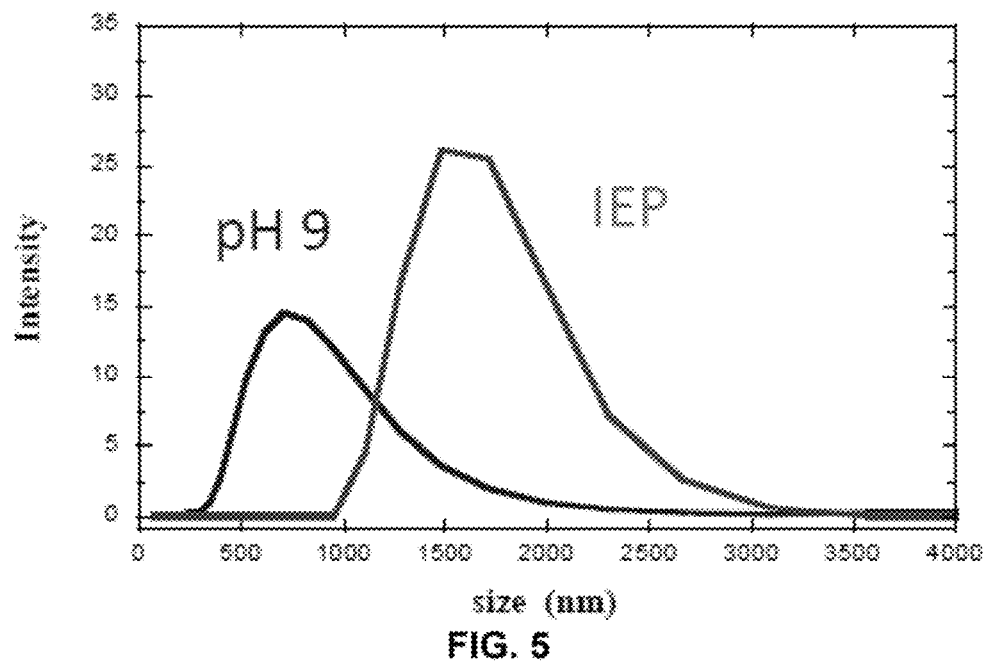
FIG. 5 shows the light scanning (PALS) measurements of lignin treated with $FeCl_3$ and $DHB/H_2O_2$.
Figure 6:
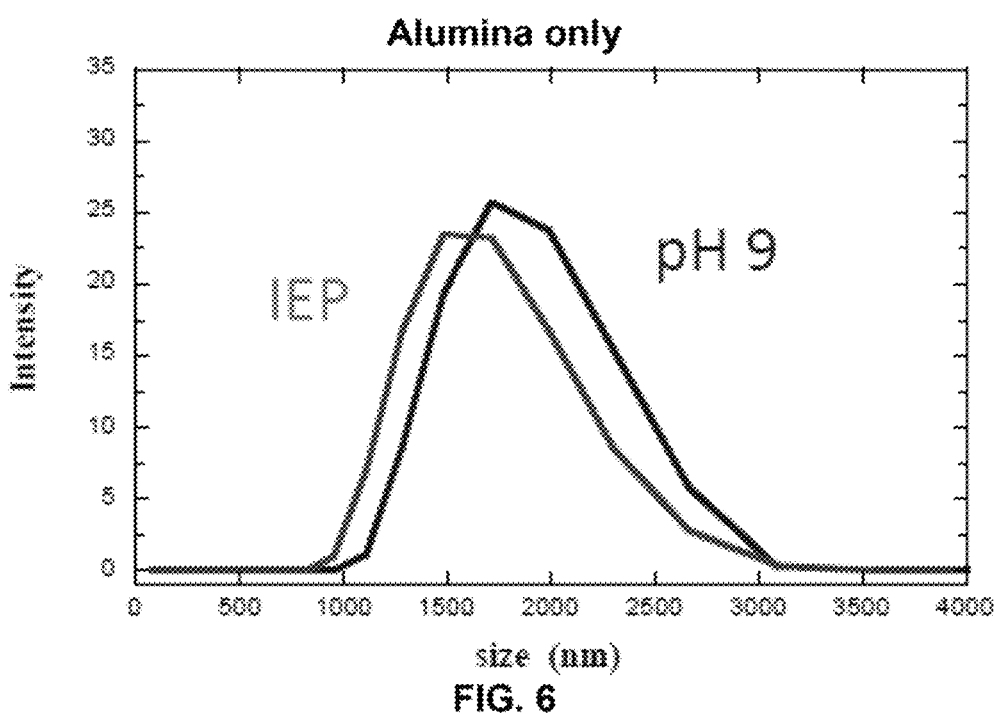
FIG. 6 shows the light scanning (PALS) measurements of lignin treated with alumina.
Figure 7:
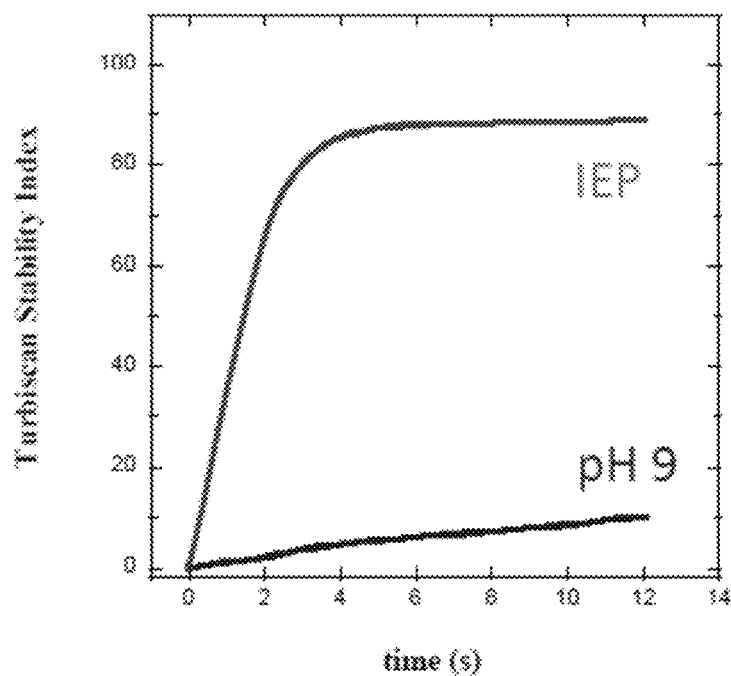
FIG. 7 shows the turbiscan stability index measurements of lignin treated with PAA.
Figure 8:
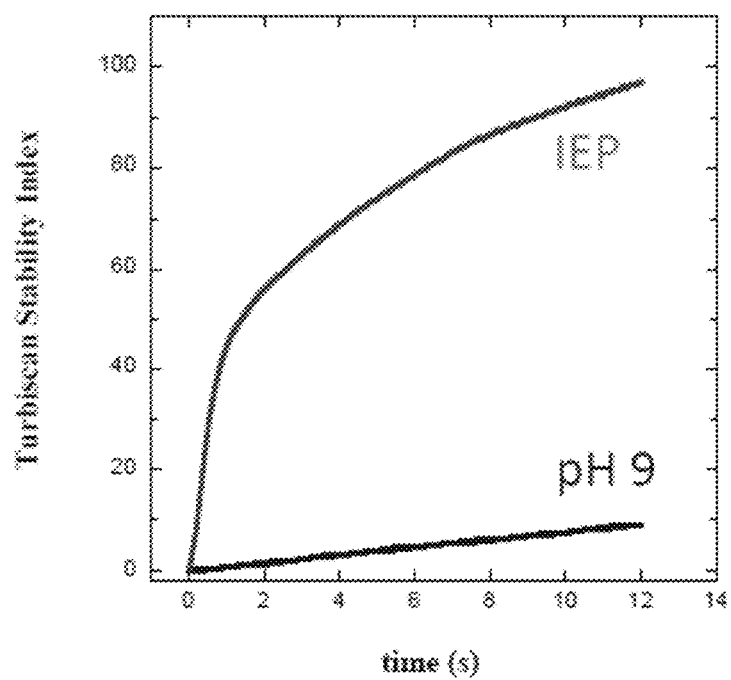
FIG. 8 shows the turbiscan stability index measurements of lignin treated with $FeCl_3$ and $DHB/H_2O_2$.
Figure 9:
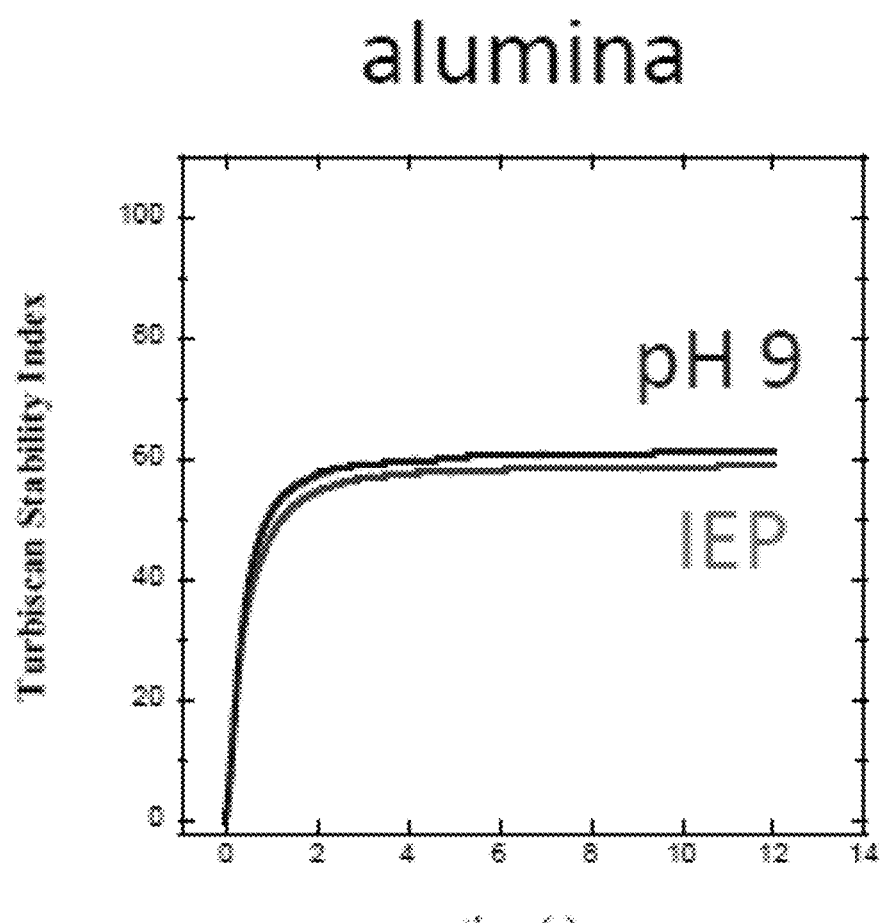
FIG. 9 shows the turbiscan stability index measurements of lignin treated with alumina.

Before the invention is described in detail, it is to be understood that, unless otherwise indicated, this invention is not limited to particular sequences, expression vectors, enzymes, host microorganisms, or processes, as such may vary. It is also to be understood that the terminology used herein is for purposes of describing particular embodiments only, and is not intended to be limiting.

In this specification and in the claims that follow, reference will be made to a number of terms that shall be defined to have the following meanings:

The terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

The term "about" includes any value up to 10% less or 10% more inclusive of the value provided.

The term "lignin" also includes the meaning of a mixture of different lignin polymers.

In some embodiments, the steps involved in the method to convert water-insoluble lignin into a water-soluble material with good dispersant properties are detailed below. The tests are performed using organosolv lignin from Lignol Corp. This material is largely insoluble in water (only about 3% by mass is soluble at pH 6).

Prepare an equimolar stock solution of dihydroxybenzene (DHB) and $FeCl_3$ (typically 10 mM) in water at pH 6. Allow the solution to incubate at least 30 min to allow DHB/Fe(III) complexes to form. Use that stock solution to prepare a solution of 4 mM DHB/Fe(III) in water at pH 6 containing lignin at 400 mg/8 ml. Stir the mixture vigorously for 24 h. Then add sufficient hydrogen peroxide ($H_2O_2$) to make 0.5% (40 mg/8 ml) and allow the reaction to proceed for 48 h. (The precise time required for completion of the reaction has not yet been determined. 48 h was chosen to ensure complete reaction) This protocol results in solubilization of 20 mg of the water-insoluble lignin into an aqueous solution at pH 6.

The product distribution (size and chemical nature of the lignin-derived molecular fragments) varies with the amount of lignin used as well as with the reaction time. GPC results are obtained for one series of reactions involving 4 mM DHB, 4 mM, $FeCl_3$, 40 mg $H_2O_{2/8}$ ml, and lignin content ranging from 2.5 mg per ml of solution to 12.5 mg per ml of solution. Reaction time was 48 h. The results show that most of the water soluble material is comprised of polymeric fragments with MW only slightly less than that of the original material.

In a particular embodiment, the method uses Fenton chemistry ($FeCl_2+H_2O_2$) and chelator-mediated Fenton chemistry ($FeCl_3+DHB+H_2O_2$) at the appropriate level of severity to generate hydroxyl radical that preferentially adds to aromatic rings and, under appropriate conditions, leading to opening of aromatic rings to yield polyacids that function as effective dispersants. Reactions conditions must be controlled properly to obtain partially oxidized high MW ring-opened fragments. Another aspect is to control the extent of ring opening, and therefore the relative amounts of hydrophobic and charged groups that strongly impact the effectiveness of a dispersant, through the reaction conditions. A third aspect is to control the reaction conditions to maximize the production of solubilized lignin material per amount of $H_2O_2$ used. Important reaction conditions that affect the amount of $H_2O_2$ required include mass of lignin per volume, pH, the use and choice of an Fe-chelator that associates with lignin and will reduce Fe(III) to Fe(II), order of addition of the reactants (combining $FeCl_3$ and DHB and lignin and mixing the dispersion extensively prior to addition of $H_2O_2$), and the amount of $H_2O_2$ used.

The chemical reaction described above is a variation of the classic Fenton reaction involving $H_2O_2$ and $FeCl_2$ that has been known for many years and has been studied with respect to breakdown of lignin (Araujo et al, 2002) and breakdown of small molecule aromatics (Chen and Pignatello, 1997; Peres et al, 2004; Huang et al 2008; Kang et al 2002). Chelator-driven Fenton reactions have been described in the literature for demethoxylation and partial breakdown of lignin (Arantes et al, 2009) as well as for breakdown of low MW aromatics (Arantes et al, 2007; Arantes et al, 2007), including the use of DHB with $FeCl_3$ (Contreras et al 2006). Solubilization of lignin yields polymeric fragments having good dispersive properties which results from suitable reaction conditions, and that this can occur with a minimal amount of the expensive reactant $H_2O_2$. When a mixture of DHB, $FeCl_3$, and lignin in water at pH 6 is stirred vigorously for a minimum of several hours prior to adding $H_2O_2$, the average size of the insoluble lignin particles is substantially reduced such that the solution appears much more homogeneous to the eye. Yet despite the homogenous appearance, upon centrifugation at 13000 rcf for 5 min nearly the entire amount of lignin pellets, indicating that chemical breakdown or molecular dissolution of the lignin polymer does not occur at this stage. However, upon addition of $H_2O_2$ to the premixed solution of lignin+DHB+$FeCl_3$ extensive chemical modification of the lignin polymer occurs resulting in a substantial mass of solubilized material.

Preincubation and vigorous mixing of lignin with DHB alone (no $FeCl_3$) results in much less effective reduction in lignin particle size. This indicates that complexes of DHB/Fe are better for solvating lignin than is DHB alone. Furthermore, addition of $H_2O_2$ and $FeCl_3$ following preincubation of lignin with DHB alone results in much less effective lignin solubilization. There is a distinct advantage to using complexes of DHB/$FeCl_3$ to reduce the particle size and improve the dispersion prior to addition of $H_2O_2$.

This invention provides a simple way convert insoluble lignin into a water-soluble product that has good dispersant characteristics using a room temperature reaction and dilute solutions of DHB, $FeCl_3$, and $H_2O_2$. The amount of lignin that can be processed per gram of $H_2O_2$, along with the cost of $H_2O_2$ and the price for the dispersant, are likely to be the main factors that will determine the economic viability of this process. Currently, the price per unit mass for PAA (commercial dispersant) is about twice the price per unit mass of $H_2O_2$. This work has already demonstrated a yield of one half the mass of lignin-derived product per unit mass of $H_2O_2$. Further improvement should result in an economically viable process.

This invention also enables control over the distribution of water-soluble products by controlling the time of reaction, the amount of $FeCl_2$ or $FeCl_3$, and the amount of lignin relative to the amount of $H_2O_2$.

Classic Fenton chemistry includes the following reactions:
1. $Fe(II)+H_2O_2 \rightarrow HO\cdot +Fe(III)+OH^-$ (fast)
2. $Fe(III)+H_2O_2 \rightarrow Fe(II)+HO_2\cdot/O_2\cdot^- +H+$ (slow)

In prior work exploring the use of Fenton chemistry to convert lignin into a valuable product or intermediate, four problems occurred that are overcome in the present method. Below the problems are first listed and then the solutions provided by this invention are described. The first problem was slow reduction of Fe(III) to Fe(II). Reduction of Fe(III) to Fe(II) is necessary to continue the oxidative reaction cycle. The second problem was effective use of $H_2O_2$ as the cost of this expensive reagent will be a major factor in the economic viability of this method. The third problem was generation of low MW acids as the primary product. The fourth problem was that a significant fraction of the carbon was lost through the generation of $CO_2$ (Mae et al 2000). This occurred because i) an excess of $H_2O_2$ was used, and ii) the generation of hydroxyl radical occurred uniformly throughout the solution and so soluble lignin fragments released from insoluble lignin were subjected to further oxidation, which ultimately led to oxidation all the way to $CO_2$ when a sufficient excess of $H_2O_2$ was present.

Solutions to the prior problems: The first problem is overcome by the use of chelator-driven Fenton reaction, using DHB. DHB chelates Fe and facilitates the reduction of Fe(III) to Fe(II). The second, third, and fourth problems are closely related, and are solved by i) using solution conditions (type of chelator and pH) that promote association of the chelator with lignin, such that the reaction occurs only in close proximity to lignin rather than homogeneously throughout the liquid; ii) maximizing the amount of lignin in the dispersion, and iii) determining the optimal amount of $H_2O_2$ so that it this reagent is not used in excess of the level needed. As shown above in (1), reaction of Fe(II) and $H_2O_2$ yields hydroxyl radical. Hydroxyl radical is highly potent but has a very short half-life ($10^{-9}$ s). If hydroxyl radical is generated homogenously throughout the solution, much of it is quenched prior to interaction with (and oxidation of) a lignin subunit. Premixing the DBH/Fe complex with lignin before addition of $H_2O_2$ improves the dispersion of the lignin, causing a reduction in particle size, and also allowing the DBH/Fe complex to associate with lignin. If the lignin is present in large excess, all the Fe will be associated with lignin and therefore the reaction with $H_2O_2$ will only occur in close proximity to lignin. This results in highly efficient use of the $H_2O_2$ for oxidizing the lignin chains. In addition, since the reaction occurs mainly near the lignin polymer, further oxidation of solubilized fragments that are released into solution will be minimized, avoiding generation of low MW acids and also loss of carbon as $CO_2$.

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

Example 1

Organosolv lignin powder from Lignol Corp (2.5 mg/ml-12.5 mg/ml) is mixed with 1,2-dihydroxybenzene (DHB) and $FeCl_3$ for 24 hrs followed by the addition of $H_2O_2$ (0.5%) to induce the reaction. The reaction is allowed to proceed for 48 hrs. About 13% of the lignin is solubilized.

Lignol lignin powder (6.25 mg/ml) is combined with $FeCl_2$ (0.5 mM-4 mM) and $H_2O_2$ (5%) to induce the reaction. The reaction is allowed to proceed for 18 hrs. When 2 mM $FeCl_2$ is used, about 10% of the lignin is solubilized.

Lignol lignin powder (3.13 mg/ml-50 mg/ml) is mixed with $FeCl_2$ (2 mM) for 24 hrs followed by addition of $H_2O_2$ (0.5%) to induce the reaction. The reaction is allowed to proceed for 48 hrs. For the best case (50 mg/ml lignin) about 10% of the lignin was solubilized.

UV absorbance measurements show that a substantial fraction of the aromatic rings are opened upon treatment involving Lignol lignin powder (6.25 mg/ml) combined with $FeCl_2$ (0.5 mM-4 mM) and $H_2O_2$ (5%), for reaction time of 18 hrs. The results also show that the fraction of aromatic rings that are opened varies as a function of the concentration of $FeCl_2$, with nearly 100% ring opening occurring at 1 mM $FeCl_2$ and fewer ring opening occurring at 4 mM $FeCl_2$. This provides a way to tune the chemical properties of the resulting product.

Infra red (IR) absorbance measurements shows that after reaction of Lignol lignin powder with 1 mM $FeCl_2$ and 5% $H_2O_2$ the aromatic bands are no longer detectable whereas strong absorbance bands in the range 1550-1700 $cm^{-1}$ are present. This result is consistent with generation of acid groups upon opening the aromatic rings.

The conditions of the reaction involving DHB, $FeCl_3$, and $H_2O_2$ are varied to optimize the amount of lignin solubilized per mass of $H_2O_2$ consumed. The best results to date are about 20 mg lignin solubilized per 40 mg $H_2O_2$ consumed.

The conditions of the reaction involving $FeCl_2$ and $H_2O_2$ re varied to optimize the amount of lignin solubilized per mass of $H_2O_2$ consumed. The best results to date are about 7.5 mg lignin solubilized per 40 mg $H_2O_2$ consumed.

Zetapotential measurements are performed to determine if the lignin-derived material has the necessary chemical characteristics (combination of hydrophobic and charged groups) to adsorb to alumina particles and impart a surface charge. Comparison is made with polyacrylic acid (PAA), a commonly used commercial dispersant material. Tests showed that the lignin-derived material that is solubilized in the reaction involving $FeCl_2$ (1 mM and 4 mM) and $H_2O_2$ (5%) produces a comparable change in zetapotential per unit mass of polymer as obtained with PAA. See FIGS. 1-9.

Example 2

Room temperature Fenton (FEN) and chelator-mediated Fenton (CMF) reactions are examined for transforming lignin from an organosolv (OS) process into a water-soluble polymer. Compared to depolymerization of lignin, this has the advantage of potentially yielding a product directly without requiring further upgrading. With the goal of optimizing the use of the expensive reagent $H_2O_2$, initial studies are performed with OS lignin in thin films with a multi-well format that allows simultaneous assay of 76 reaction conditions. Results show that $H_2O_2$ is more efficiently used in CMF compared with FEN, and that the greatest amount of lignin solubilized per mass of $H_2O_2$ consumed occurs at low initial concentrations of $H_2O_2$ (<1%). Further optimization of reaction conditions is performed with OS lignin in powder form. Optimizing reactant concentrations, pH, Fe-chelator, and with $O_2$ bubbling during the reaction the results indicate that a yield of 1 g lignin solubilized per g of $H_2O_2$ consumed is achievable. Chemical and molecular weight analyses showed that the reaction results in opening of the aromatic rings and generation of acid groups, yielding a water-soluble polymer with molecular weight distribution that is comparable to that of the starting material, but with a small amount of low MW species.

This example explores the use of the Fenton reaction (FEN) and chelator-mediated Fenton (CMF) reaction to generate a useful material from lignin, produced from an Organosolv process, by directly transforming it into a watersoluble polymer. In these well-studied reactions (8-17) Fe(II) reacts with $H_2O_2$ to yield Fe(III) and hydroxyl radical, which is a highly potent oxidant. For Fe to be used catalytically, Fe(III) must be reduced to Fe(II). In FEN this occurs slowly (and inefficiently with respect to $H_2O_2$ usage) through reaction of Fe(III) with $H_2O_2$. In CMF, reduction of Fe(III) to Fe(II) occurs more rapidly and without consuming $H_2O_2$ using an organic Fe chelator/reducer. In addition to improved oxidative efficiency, CMF operates efficiently over a wider pH range than FEN, which is only effective near pH 3 (to avoid oxidation of Fe(II) to $Fe(OH)_3$ or $Fe_2O_3$).(18) Under optimal CMF conditions $H_2O_2$ can be used efficiently to open nearly all the aromatic rings functionalized material directly from even the most intransigent portion of a lignin stream. As for other polyacids such as lignosulfonates and poly(acrylic acid) (PAA), the lignin-derived water-soluble polyacid product has many potential applications, including as a thickener, dispersing agent, emulsifying agent, plasticizer for concrete and cement, curing agent for adhesives, water-reducer in plasterboard/fiberboard, or viscosity reducer of drilling fluid in oil drilling. Furthermore, the polyacid material could be crosslinked to form a hydrogel. As an example of a potential application of this lignin-derived polyacid material, without further upgrading or separation, this material performs comparably to PAA in dispersing alumina particles.

The economic viability of this process requires highly efficient use of the expensive reagent $H_2O_2$ (~$800/MT) Prior work involving FEN for biomass conversion typically involved relatively large amounts of $H_2O_2$ (>5%). With the goal of maximizing efficient use of $H_2O_2$, an initial optimized CMF reaction conditions is performed using an assay for lignin breakdown based on insoluble lignin films, followed by further optimization using lignin in powder form. FEN and CMF reactions have been explored extensively for use in water purification. In that case, the presence of substrate in dilute concentration makes efficient use of $H_2O_2$ especially challenging since hydroxyl radicals are highly reactive. $H_2O_2$ is used more efficiently at low $H_2O_2$ concentration and high substrate concentration.

The results demonstrate that the product of the reaction is a ring-opened polymer of comparable molecular weight to the original material but including a small amount of low molecular weight species. Possible uses of a water-soluble polymer from lignin include, but are not limited to, as a dispersant or as an anti-fouling agent for water handling equipment. Poly(acrylic acid) (PAA), derived from petrochemicals, is an industry standard polymer used in these applications, and therefore we compared the lignin-derived water-soluble polymer to PAA for dispersing alumina particles.

Materials

Organosolv (OS) lignin is obtained from Lignol Corp. Aminopropyltriethoxysilane (APS), 2,2'-azino-bis(3-ethylbenzothiazoline-6-sulphonic acid) (ABTS), $FeCl_2$, $FeCl_3$ hexahydrate, 1,2-dihydroxybenzene (DHB), 2,3-dihydroxybenzoic acid (DHBA), 1,2,3 trihydroxybenzene, poly(acrylic acid) with weight average molecular weight of 2000 g/mol, KNO3, HNO3, and KOH are purchased from Sigma-Aldrich. $H_2O_2$ (~35%) is purchased from Fisher Scientific. Laccase from *Tinea versicolor* (10 U/mg) is purchased from US Biological. Silicon wafers are undoped type N with 1-0-0 orientation. Alpha alumina oxide powder AKP-30 is obtained from Sumitomo Corp.

Reactions Involving Lignin Films

Preparation of lignin films for use in this assay has been described previously. Prior to coating the silicon substrates with lignin, APS is deposited to promote adhesion. Silicon wafers (3-inch diameter) are first cleaned with detergent solution and then received UV-ozone treatment for 30 min. Smooth films of APS are deposited onto UV-ozone cleaned silicon wafers by spin coating. APS is dissolved into 90/10 ethanol/water at 0.25% and stirred for 60 min. The solution is then spin coated onto the silicon wafers at 3000 rpm. Afterwards the APS-coated wafers are heated in vacuum at 70° C. for 1 hr to drive off the water and cure the film.

Lignin is dissolved at 2% or 3% in 1,4 dioxane, filtered through a 1 μM syringe filter, and spin coated onto silicon wafers using a Headway photo resist spinner model 1-PM101DT-R790 at 3000 rpm. The lignin-coated wafers are heated in vacuum at 70° C. for 1 hr to drive off the dioxane.

The lignin film assay measures the solubilization of lignin upon reaction, and therefore requires a lignin film that is largely insoluble in absence of reaction. It is found that the solubility of OS lignin increases substantially with increasing concentration of $H_2O_2$ ($[H_2O_2]$). Therefore, to screen over a wide range of $[H_2O_2]$, the lignin films are first treated with oxidized ABTS to reduce the film solubility in the presence of high $[H_2O_2]$ in absence of FEN or CMF reactions. Laccase (25 μg/ml) is added to a 1 mM solution of ABTS in 10 mM sodium lactate buffer at pH 4.5 and allowed to catalyze the oxidation of ABTS for 30 min. UV absorbance indicate that under these conditions the maximum concentration of oxidized ABTS is achieved after incubation for 20 min. Following incubation for 30 min, the solution is filtered through a 10,000 g/mol molecular weight cutoff (MWCO) filter to remove the laccase. The lignin films are then incubated against the solution of oxidized ABTS. Following overnight incubation, the wafers are removed and then rinsed thoroughly with Millipore water.

Film thickness measurements are automated using a NanoSpec 6100 spectral reflectometer from Nanometrics, with a wavelength range of 480-800 nm. By means of a motorized sample stage and a pre-defined test pattern, the tool semiautonomously measured each well location. Pre-reaction data are collected with one measurement per well location. Postreaction data are collected in triplicate, with measurement sites targeted at the center of the well, offset slightly above the center line, and offset slightly below the centerline.

Reactions Involving Lignin Powder

Reactions using lignin powder as the substrate are performed in 20 ml vials with 8 ml of liquid. A stock solution of 10 mM $FeCl_3$ and 10 mM DHB is prepared and the pH adjusted to the desired initial value for the reaction using NaOH. The appropriate amount of this stock solution to achieve the desired concentration is added to the reaction vial along with lignin, and Millipore water (also adjusted to the desired pH). The mixture is stirred with a magnetic stirring bar for 24 h to disperse the lignin and then the appropriate amount of aqueous $H_2O_2$ is added to initiate the reaction. The reactions are allowed to proceed for 48 h (much longer than necessary) and then the suspensions are centrifuged at 13000×g for 5 minutes to separate water-soluble material from the insoluble lignin. The water insoluble material is thoroughly dried in a vacuum oven and then weighed to determine the mass of lignin solubilized as the difference from the initial weight. For each reaction a control is included for which no $H_2O_2$ is added. This is processed in an identical fashion to the reacting samples. For these control samples a few percent mass loss is consistently observed as a small amount of lignin material is soluble in the reaction medium in absence of reaction. The mass loss for the control is subtracted from the mass loss for the reacting samples and the difference is reported as mass solubilized by the reaction. The control measurements indicated whether or not the chelator complex is insoluble or associated strongly with the insoluble lignin. With DHB, the mass of the Fe(DHB) complex is measured with the insoluble pellet whereas for DHBA the mass of the Fe(DHBA) complex remained in solution.

To compare with results for single batch reactions, a series of successive reactions are performed. In this case after reaction the liquid and solid are separated by centrifugation, the liquid is decanted, and new aliquots of the reactants and $H_2O$ are added. For each successive reaction the amounts of reactants are added to achieve the same initial concentrations and the total volume is adjusted to achieve the same mass of lignin per volume, accounting for the decreased amount of lignin that resulted from solubilization during the prior reaction.

GPC.

The molecular weight distribution of the water-soluble material from reactions with lignin powder is measured using an Agilent 1260 HPLC system with PL Aquagel-OH 30 and PL Aquagel-OH 50 columns and UV detection at 210 nm. Because of the amphiphilic nature of the lignin-derived polyacid, special care is taken to avoid or minimize aggregation during the measurement. In a series of measurements it is determined that the water-soluble product material is not fully soluble at high salt concentrations. A sample is measured at a series of decreasing phosphate buffer concentrations until little change is observed in the chromatograms. A 1 mM $PO_4$ buffer is used for the molecular weight determinations, using polyacrylic acid standards and also methacrylic acid for calibration. The molecular weight distribution of the original Lignol lignin is measured in THF using an Agilent 1100 series with two Millipore Waters Styragel HR 4E columns. In that case PS standards are used for calibration.

FTIR.

FTIR spectra are collected from residual solid material after evaporating reaction liquids onto Teflon substrates. IR spectra are collected with a Bruker LUMOS ATR-FTIR microscope using a germanium probe tip contacting the material of interest. A total of 3 spectra are taken and averaged per material with each spectrum consisting of 16 averaged scans at a resolution of 4 $cm^{-1}$. Spectra are referenced to a non-sample background and an atmospheric correction is applied to remove water and $CO_2$ vapor contributions.

To Test Dispersant Properties of the Water-Soluble Product from CMF

Preparation of Dispersions for Zeta Potential, Particle Size Distribution, and Turbiscan Stability Analysis.

Alpha aluminum oxide, a-$Al_2O_3$, is used as the ceramic powder for dispersion testing. For zeta potential and particle size distribution measurements, alumina powder, KNO3 stock solution, aqueous lignin-derived dispersant (or PAA) solution, and water are combined to yield 1-4 mg lignin (or PAA) per gram alumina powder at 10% solids loading. For Turbiscan stability analysis, 8 g alumina powder are mixed with KNO3 stock solution, aqueous lignin-derived dispersant (or PAA) solution, and water to yield 40 ml of 1 mM KNO3, 4 mg dispersant/g alumina, and 5 volume % solids concentration. Dispersion is achieved using an ultrasonic probe (Branson ultrasonics) at 50% power for 10 minutes in a cup horn cell to break up weak agglomerates.

Particle Size Distribution by Light Scattering.

Measurement of particle size is conducted using a Zetasizer Nano-ZS from Malvern instruments. The stock dispersion at 5 volume % is mixed by a rotary agitator unit (Maxi-mixer) for 2 minutes, then diluted in $10^{-3}$ M $KNO_3$ solution in two stages in order to prepare low concentration ($10^{-4}$ wt %) suspensions for particle size measurement. Ten measurements of each sample are performed and examined for particle sedimentation or drift in response with time. The particle size distribution is presented as the average of the ten measurements.

Zeta Potential.

A Stabino particle charge mapping instrument (ParticleMetrix, GmbH) is used to evaluate the pH titration behavior of the alumina particles and to compare the effect of PAA as a known dispersant with the lignin-derived materials. Zeta potential is measured on dilute dispersions of Sumitomo AKP-30 alumina powder (a-$Al_2O_3$) in $10^{-3}$ M $KNO_3$ electrolyte solution as a function of pH. The initial suspension is adjusted to pH 10 using 0.1 M KOH solution, and zeta potential vs. pH is determined using a dynamic addition profile (aliquots between 10-100 uL, and 10-25 sec between each measurement point) to titrate to pH 4 with 0.1 N $HNO_3$. Baseline values are determined for the as-received powder and for samples in the presence of PAA.

Turbiscan Stability Index Measurements.

Suspensions are evaluated for stability using a Turbiscan Lab analyser. This instrument performs an optical scan over the height of the sample, measuring transmittance and backscatter via two sensors located at 180 degrees (backscatter, BS) and 45 degrees (transmittance) of the pulsed IR light (880 nm). For each time point transmitted and backscattered intensities are collected over the total height of the suspension. The scans are analyzed to determine the sedimentation rate of particles within the standing fluid. The temperature during the measurement is maintained at 30° C., and the duration of the test is 12 hours. Suspensions are tested at 5 volume % alumina.

Sedimentation within the initially opaque suspension is evaluated using the backscatter profile. The difference in the measured values at each time point compared to the values from the initial scan are plotted as DBS versus height profiles. The behaviour of different systems are quantitatively compared the dispersion stability, where a lower TSI indicates a more stable dispersion. The TSI is calculated by proprietary software using the time-dependent changes in both transmittance and backscatter over the entire height of the column.

Results

Figure 10:
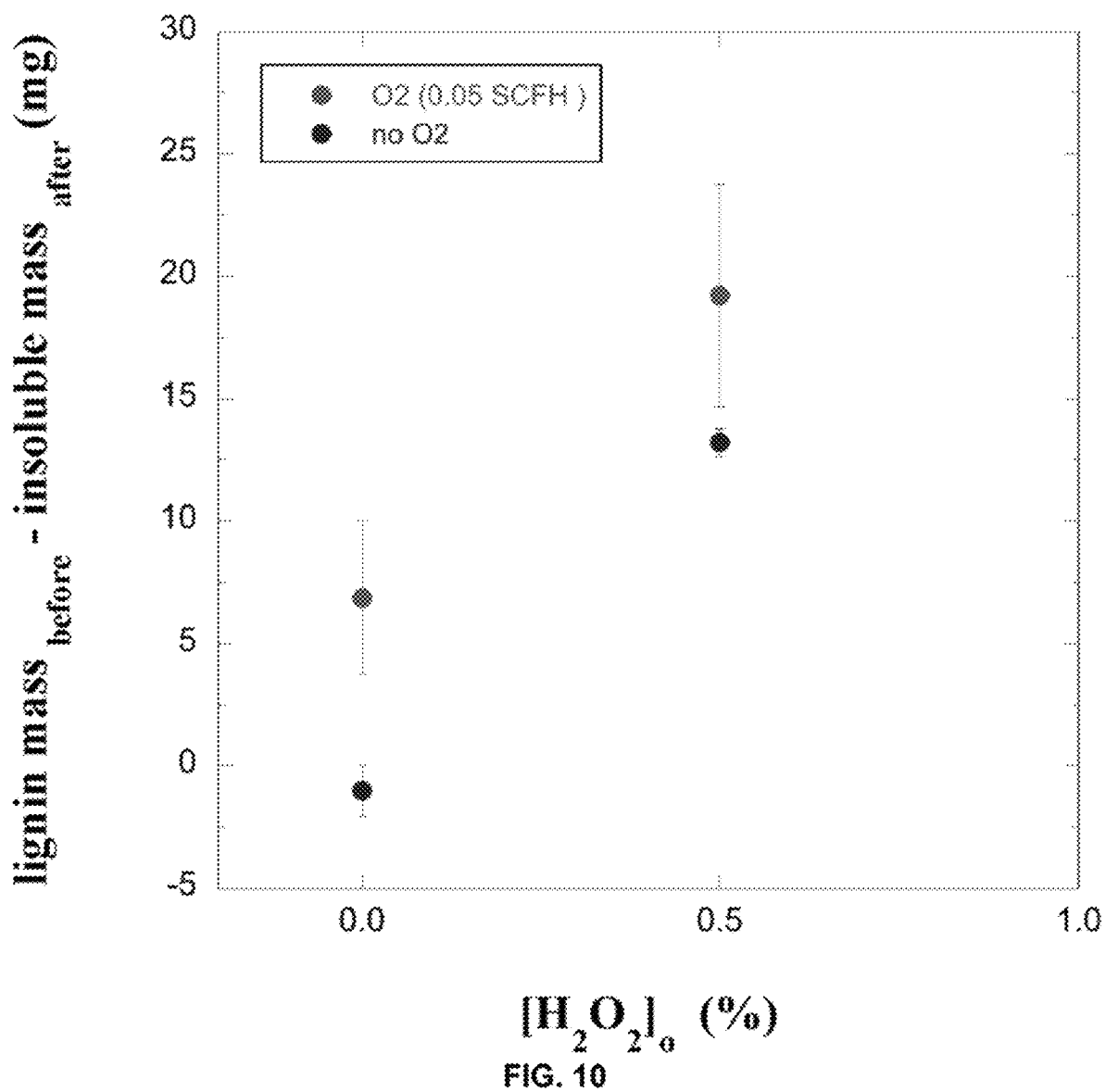
FIG. 10. shows the effect of bubbling 100% $O_2$ on the yield of solubilized lignin. Reactions are performed using 100 mg of lignin in 8 mls and $[FeCl_2]o=[DHB]o=4$ mM at initial pH of 6.

DHB gives the highest yield of the three Fe chelators/reducers at pH 6. DHB gives higher yield than DHBA despite the fact that the kinetics of Fe(III) reduction are faster for DHBA than for DHB (reactions performed at pH 4.5). Our data suggests that the better yield of water-soluble material with DHB is due to a stronger association of DHB with lignin than for the more soluble DHBA. Stronger association of the Fe(DHB) complex with lignin is indicated in the control measurements performed in absence of added $H_2O_2$. In these measurements, the mass of the Fe(DHB) complex is detected with the insoluble lignin (yielding a total insoluble mass that is greater than that of the initial mass of lignin). On the other hand for DHBA the mass of the Fe(DHBA) complex is not detected with the insoluble lignin, indicating that the complex remained soluble. For a chelator/Fe(III) complex that is sparingly soluble and associates with lignin, it is more likely that hydroxyl radical will be generated in the immediate vicinity of lignin and participate in a productive reaction with lignin. This may explain the higher yield for DHB than for DHBA. Prior work has shown that upon interaction of hydroxyl radical with an aromatic ring to form a cyclohexdienyl radical, ring opening is favoured over other decay pathways in the presence of dissolved $O_2$.(9) Therefore, it is postulated than the yield of solubilized lignin may increase with air or $O_2$ bubbling during the reaction. To test this a series of reactions are performed with and without bubbling of 100% $O_2$ (0.05 standard cubic feet per hour) with 100 mg lignin in 8 mls, $[H_2O_2]o=0.5\%$, and $[FeCl_3]o=[DHB]o=4$ mM at initial pH 6. The reactions and controls (no $H_2O_2$) are performed in triplicate. The results, shown in FIG. 10, indicate a 45% increase in yield of solublized lignin with $O_2$ bubbling relative to that in absence of $O_2$ bubbling.

Given the evidence that solublization occurs through opening of the aromatic rings to produce acid groups, an estimate of the theoretical maximum yield of lignin per amount of $H_2O_2$ consumed is presented. One molecule of $H_2O_2$ will produce one hydroxyl radical in the Fenton reaction. At high $H_2O_2$ concentrations hydroxyl radical can react with $H_2O_2$, decreasing the amount of $H_2O_2$ available to oxidize lignin. However, in the process the concentration of $H_2O_2$ is always kept sufficiently low (~0.5%) such that that reaction should be negligible. In the presence of dissolved $O_2$, one hydroxyl radical is sufficient to open the ring of one lignin monomer. The mole ratio of 1 molecule $H_2O_2$ per 1 aromatic ring opened corresponds to a mass ratio of 1 g $H_2O_2$ per 4.7 g lignin, assigning 160 g/mol per lignin monomer. However hydroxyl radicals attack lignin subunits by abstracting aliphatic Ca hydrogens as well as by adding to aromatic rings. Based on the molecular weight ratio of an aromatic ring to the total mass of a lignin monomer we estimate that only half the radicals that interact with lignin will add to an aromatic ring. If an hydroxyl radical adds to an aromatic ring at the site of a methoxy group the most likely effect is release of methanol rather than ring opening. Likewise, if a hydroxyl radical adds to an aromatic ring at the site of a b-O-4 ether linkage the most likely effect is cleavage of the ether bond. Assuming on average one methoxy group and one b-O-4 ether linkage per aromatic ring, only four sixths of the reactions of hydroxyl radical with aromatic rings will result in ring opening. Therefore, it is estimated that a theoretical mass yield of 4.7 g ligninx (½)x(⁴⁄₆) or 1.6 g lignin solubilized per 1 g $H_2O_2$ consumed. This assumes nearly all the rings must be opened to solubilize lignin, which is consistent with our IR data showing complete absence of the aromatic IR for the solubilized material. The fact that the pH is low (<3) after reaction is consistent with the observation that most of the rings are opened in the water-soluble material. It is expected that would not be the case if the pH are maintained at a higher value during the reaction. The estimated theoretical mass ratio of 1.6 g polyacid product per 1 g $H_2O_2$ consumed is 3.2 times greater than the best mass ratio of 0.5 g polyacid product per 1 g $H_2O_2$ for individual batch reactions. However, considering a mass ratio of polyacid product per $H_2O_2$ consumed of 0.8 achieved for multiple successive reactions and a further 45% increase in yield with $O_2$ bubbling, it is concluded that mass ratios greater than 1 are achievable.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method to depolymerize a lignin, the method comprising: (a) premixing a chelator and $FeCl_3$ for at least 30 minutes, (b) mixing a lignin and the premixed chelator and $FeCl_3$ of step (a) to produce a first solution, (c) incubating the solution for a first suitable period of time, (d) introducing an oxidizing agent to the first solution to produce a second solution, (e) incubating the solution for a second suitable period of time; such that at least one aromatic ring of one lignin polymer is opened to form a water-soluble polyacid, (f) separating the water-soluble polyacid from insoluble lignin, and (g) using the polyacid as a thickener, an emulsifying agent, a plasticizer, a curing agent, a water-reducer, a viscosity reducer, a dispersant, or an anti-fouling agent, or cross-linking the polyacid to form a hydrogel.

2. The method of claim 1, wherein the polyacid comprises two carboxylic functional groups.

3. The method of claim 1, wherein the method results in a mixture of lignin polymers comprising more than one polymer wherein each polymer has at least one aromatic ring opened, wherein optionally each polymer has the opened aromatic ring on a different part of each polymer.

4. The method of claim 1, wherein the method results in at least about 1 mg of water-insoluble lignin is converted into a water-soluble lignin from every 100 mg of water-insoluble lignin.

5. The method of claim 1, wherein the oxidizing agent is $H_2O_2$ or molecular oxygen ($O_2$), or both.

6. The method of claim 1, wherein the (d) introducing an oxidizing agent to the first solution step comprises bubbling a gas composition comprising $O_2$ into the first solution.

7. The method of claim 6, wherein the gas composition comprises at least about 20% of $O_2$.

8. The method of claim 7, wherein the gas composition comprises essentially 100% of $O_2$.

9. The method of claim 6, wherein the gas composition is bubbled through the first solution at a rate of at least about 0.01 standard cubic feet per hour (SCFH).

10. The method of claim 9, wherein the gas composition is bubbled through the first solution at a rate of at least about 0.05 standard cubic feet per hour (SCFH).

11. The method of claim 1, wherein the (d) introducing an oxidizing agent to the first solution step results in at least about 0.1% of [oxidizing agent]$_0$.

12. The method of claim 11, wherein the (d) introducing an oxidizing agent to the first solution step results in at least about 0.5% of [oxidizing agent]$_0$.

13. The method of claim 1, wherein the chelator is any chelator that can chelate Fe to facilitate the reduction of Fe(III) to Fe(II).

14. The method of claim 1, wherein the chelator is 1,2-dihydroxybenzene (DHB), 2,3-dihydroxybenzoic acid (DHBA), pyrogallol, or a mixture thereof.

15. The method of claim 1, wherein the chelator is 1,2-dihydroxybenzene (DHB).

16. A mixture of depolymerized lignin produced by the method of claim 1.

17. The method of claim 1, wherein the step (f) comprises using the polyacid as a thickener, an emulsifying agent, a plasticizer, a curing agent, a water-reducer, a viscosity reducer, a dispersant, or an anti-fouling agent.

18. The method of claim 1, wherein the step (f) comprises cross-linking the polyacid to form a hydrogel.

19. The method of claim 1, wherein at least 1 mg of water-insoluble lignin is converted in water-soluble polyacid from every 100 mg of water-insoluble lignin.

20. The method of claim 19, wherein at least 10 mg of water-insoluble lignin is converted in water-soluble polyacid from every 100 mg of water-insoluble lignin.

21. The method of claim 20, wherein at least 20 mg of water-insoluble lignin is converted in water-soluble polyacid from every 100 mg of water-insoluble lignin.

22. A method to convert water-insoluble lignin into water-soluble polyacid, the method comprising: (a) mixing a 1,2-dihydroxybenzene (DHB)/Fe complex with water-insoluble lignin to produce a first solution, (b) incubating the solution for a first suitable period of time, (c) introducing an oxidizing agent to the first solution to produce a second solution, (d) incubating the solution for a second suitable period of time; such that at least one aromatic ring of one water-insoluble lignin is opened to form a water-soluble polyacid, and (e) separating the water-soluble polyacid from water-insoluble lignin.

23. The method of claim 22, wherein the oxidizing agent is $H_2O_2$ or molecular oxygen ($O_2$), or both.

24. The method of claim 22, wherein at least 1 mg of water-insoluble lignin is converted in water-soluble polyacid from every 100 mg of water-insoluble lignin.

25. The method of claim 24, wherein at least 10 mg of water-insoluble lignin is converted in water-soluble polyacid from every 100 mg of water-insoluble lignin.

26. The method of claim 25, wherein at least 20 mg of water-insoluble lignin is converted in water-soluble polyacid from every 100 mg of water-insoluble lignin.

* * * * *